United States Patent [19]

Tracy et al.

[11] 4,387,178

[45] Jun. 7, 1983

[54] COMPRESSIBLE SOFT ASBESTOS FREE GASKET MATERIAL

[75] Inventors: Douglas H. Tracy, Putnam; Jeffrey B. Otto, Brooklyn; Bruce M. Arnio; Elizabeth L. Callan, both of Danielson, all of Conn.

[73] Assignee: Rogers Corporation, Rogers, Conn.

[21] Appl. No.: 317,196

[22] Filed: Nov. 2, 1981

[51] Int. Cl.$^3$ .................... C08K 7/02; C08K 7/18; B32B 27/34

[52] U.S. Cl. .................... 524/448; 277/235 A; 277/235 B; 277/DIG. 6; 428/325; 428/331; 428/394; 428/395; 428/397; 428/401; 428/477.4; 524/509; 524/514

[58] Field of Search .................... 428/477.4, 288, 395, 428/394, 280, 401, 325, 331, 397; 277/DIG. 6, 235 A, 235 B; 524/448, 514, 509

[56] References Cited

U.S. PATENT DOCUMENTS

| | | | |
|---|---|---|---|
| 3,600,269 | 8/1971 | Daniels | 428/290 |
| 3,788,651 | 1/1974 | Brown | 277/DIG. 6 |
| 3,956,566 | 5/1976 | Van Gils | 428/477.4 |
| 3,969,568 | 7/1976 | Sperley | 428/477.4 |
| 4,320,823 | 3/1982 | Covaleski | 428/326 |
| 4,330,442 | 5/1982 | Lindeman | 524/448 |

*Primary Examiner*—Ellis P. Robinson
*Attorney, Agent, or Firm*—David S. Fishman

[57] ABSTRACT

A gasket material comprised of fibrillated aramid fibers, diatomaceous earth and either a polyethylacrylic or polybutylacrylic latex alone or in combination with conventional curatives, antioxidants and pigments. The constituent materials are combined in a beater-addition process, and the pliable gasket material is then formed on conventional paper making equipment.

6 Claims, No Drawings

COMPRESSIBLE SOFT ASBESTOS FREE GASKET MATERIAL

BACKGROUND OF THE INVENTION

(1) Field of the Invention

This invention relates to a highly compressible soft asbestos free gasket material and a method of manufacture thereof. Specifically, this invention is directed to a gasket material which is comprised of fibrillated aramid fibers, diatomaceous earth, a phenolic resin and either a polyethylacrylic or polybutylacrylic latex alone or in combination with various processing agents, the gasket material being free of asbestos fibers.

(2) Description of the Prior Art

For many years, gasket materials for many important uses have contained asbestos fibers. Asbestos fibers have been uniquely suited for gasket materials because of their ability to impart to the gasket material critically important performance and structural features such as heat resistance, good sealability and desirable mechanical properties such as compressibility, creep resistance and tensile strength. When it has been necessary that a gasket material have a high degree of resistance to acids and alkalis and have a high degree of compressibility, African blue (crocidolite) asbestos was used in place of the white (chrysotile) asbestos. The use of asbestos fibers has always been desirable because of their ready availability and low cost.

Recent concerns about the health hazards associated with exposure to asbestos fibers have resulted in concerted efforts to produce asbestos-free gasket materials. However, this highly desirable objective has not been achieved merely by substituting other fibers for asbestos fibers.

Asbestos-free gasket materials are disclosed in U.S. patent applications Ser. Nos. 953,445; 170,743; and 259,984, which are assigned to the assignee of the present application. The gasket materials of the above-identified co-pending applications are suitable for replacing the prior gasket materials which contain the white (chrysotile) asbestos. While the gasket materials disclosed in the above-identified co-pending applications exhibit substantially similar characteristics and properties to those prior gasket materials which contain white asbestos, they do not possess the greater resistance to acids and alkalis which are characteristic of gasket materials containing African blue (crocidolite) asbestos, nor do they possess an equivalent degree of compressibility.

Furthermore, it has not been proven possible to merely substitute other fibers for the African blue asbestos fibers and still achieve a gasket material of comparable characteristics. By way of example, the substitution of cellulose fibers for crocidolite asbestos will produce a gasket material which will not function effectively at temperatures up to 500° F. and will not possess an acceptable resistance to alkalis.

SUMMARY OF THE PRESENT INVENTION

The present invention overcomes the above-discussed disadvantages and other deficicencies of the prior art by providing an asbestos free gasket material which has the desired acid and alkali resistance and high compressibility of prior art African blue (crocidolite) asbestos containing gasket materials and which functions effectively at temperatures up to 500° F.

In accordance with the present invention a gasket material is formed from a material comprised of a fibrillated aramid fiber, diatomaceous earth, a phenolic resin, and either a polyethylacrylic or polybutylacrylic latex alone or in combination with conventional curatives, antioxidants and pigments. The resulting gasket material has substantially the same acid and alkali resistance and degree of compressibility which characterize prior art gasket materials containing African blue (crocidolite) asbestos and the gasket material of the present invention functions at temperatures up to 500° F.

The term fibrillated as utilized herein shall mean the partial cleavage or separation of an aramid filiment into fibrillar fragments which remain mechanically attached to the main fibril.

Compressibility, as used with respect to gasket materials, refers to the percentage of thickness deformation from the free state thickness to the resulting thickness when subjected to a standard compressive load of 5000 p.s.i. The standard definition of varying degrees of compressibility are as follows:

| COMPRESSIBILITY | THICKNESS DEFORMATION |
| --- | --- |
| Low | 10% |
| Medium | 20%–30% |
| High | 40% and above |

The aramid fibers which are useful in the practice of the present invention are chemically composed of a poly p-phenylene terephthalamide with the chain configurations extended.

DESCRIPTION OF THE PREFERRED EMBODIMENT

The present invention is an improvement over the asbestos-free gasket materials disclosed in U.S. applications Ser. Nos. 953,445; 170,743; and 259,984, which are assigned to the assignee of the present application and are incorporated herein by reference. The gasket materials disclosed in the referenced applications may be utilized as a substitute for prior art gasket materials containing white (chrysotile) asbestos, with the resulting asbestos free gasket material having substantially similar characteristics to the prior art materials. However, the gasket materials of the referenced applications, like gasket materials containing white asbestos, have relatively poor resistance to acids and alkalis. For some uses, particularly in the chemical processing industry, gaskets must be able to withstand exposure to various acids and alkalis and be highly compressible. Up to this time only gasket materials containing African blue (crocidolite) asbestos could be used for gaskets which were to be exposed to either acids or alkalis.

The present invention provides a highly compressible gasket material which has high resistance to acids and alkalis and also functions effectively as a gasket material at temperatures up to 500° F.

The present invention provides a gasket material which is comprised of fibrillated aramid fibers, diatomaceous earth, a phenolic resin and either a polyethylacrylic or polybutylacrylic latex alone or in combination, with conventional curatives, antioxidants, and pigments. The chart below discloses the permissible and preferred variations in proportions of the above-identified constituents.

| CONSTITUENTS | PERCENTAGE OF TOTAL SOLIDS | |
|---|---|---|
| | Permissible | Preferred |
| Fibrillated Aramid Fibers | 5–40 | 10–15 |
| Diatomaceous Earth | 25–85 | 60–75 |
| Phenolic Resin | 0.5–10 | 2–5 |
| Polyacrylic Latex of either ethyl or butyl acrylates alone or both in combination | 5–25 | 7–22 |
| Curatives, Antioxidents, Pigments | 1–10 | 2–5 |

As stated above, the aramid fibers useful for the practice of the present invention are chemically composed of poly p-phenylene terephthalamide with the chain configurations extended. The resulting fibers have a high modulus and tensile strength. The essential characteristics of these aramid fibers is their capability of being fibrillated and their inherent high thermal stability. The preferred method of fibrillation of these aramid fibers is the mechanical shearing of the fibers in a water slurry which is commonly referred to as beating or refining. This fibrillation of the aramid fibers increases their surface area 40 to 50 times which enables the use of less fibers by weight. Furthermore, fibrillated aramid fibers act as a filter medium during the processing on paper making equipment and also increase the strength of the finished product by forming an entangled fiber structure which increases the retention of the diatomaceous earth in the finished product.

Diatomaceous earth suitable for use in the practice of the present invention should be of a particle size ranging between 1–100 microns and have less than 5% organic content. A phenolic resin suitable for use in the practice of the present invention may be synthesized by reacting 9.45 moles of phenol with 19.4 moles of an aqueous formaldehyde solution. The use of a phenolic resin in conjunction with a polyacrylic latex provides a gasket material in accordance with the present invention with improved torque (creep relaxation) retention at elevated temperatures, compressive strength and resistance to acids, alkalis, solvents and alcohols.

The polyacrylic latex is comprised of either ethyl or butyl acrylates, alone or in combination, and a small amount of acrylonitrile to cross link the acylates. The amount of the acrylates and acrylonitrile composition should be such to achieve the desired characteristics of the final product. Too much of the acrylates will result in a product that is elastic (thermoplastic) and not possessing the desired compressibility. Too much of the acrylonitrile will result in a hard product due to excessive cross-linking of the acrylates. The preferred percentage by weight of solids of the polyacrylic is 90% of either the ethyl or butyl acrylates alone or in combination and 10% of the acrylonitrile, which has approximately 3% cross-linking monomers. The latex composition itself should preferrably be a 50% emulsion of the polyacrylic solid in water. However, the percentage by weight of the polyacrylic solid may vary between 1% to 70%. Alcohol/water systems may also be used as the emulsion medium in the practice of the present invention.

In order to obtain the desired physical properties in the final product and to allow processing on paper making equipment, the fibrillated fibers should have a length ranging between one half to four millimeters, preferably approximately two millimeters, and a diameter ranging between 0.001 to 0.0035 millimeters. It is also important to have the fibers available in a "wet lap" form for processing on paper making equipment. A wet lap form refers to an incomplete drying of the aramid fibers after being fibrillated. This "wet lap" form allows the fibers to be redispersed in water at concentrations of one half to four percent. An aramid fiber well suited for the use in the practice of the present invention is sold by E. I. duPont de Nemours & Co. under the trademark KEVLAR 979 pulp.

The following are examples of various percentages of the constituents, by weight, in a material prepared in accordance with the present invention:

EXAMPLE 1

| CONSTITUENT | PERCENT OF TOTAL SOLIDS |
|---|---|
| Aramid Fibers (KEVLAR 979) | 11.95 |
| Diatomaceous Earth (CELITE 321, available from Johns Manville Company) | 71.74 |
| Pigments, Curatives and other conventional processing aids | 2.44 |
| Phenolic Resin (SL 3224, available from Bordons) | 3.11 |
| Polyacrylic Latex (Vultex 491-5D, available from General Latex Corp.) | 10.76 |

EXAMPLE 2

| CONSTITUENTS | PERCENT OF TOTAL SOLIDS |
|---|---|
| Aramid Fiber (KEVLAR 979) | 10.7 |
| Diatomaceous Earth (CELITE 292) | 73.5 |
| Zinc Oxide | 0.5 |
| Phenolic Resin (MR 1100, a water dispersable phenolic resin available from Rogers Corporation, Rogers, CT.) | 3.2 |
| Polyacrylic Latex (Vutex 491-5D) | 11 |
| Blue BH (blue dye sold by Internation Dye Stuff Corporation) | 1.1 |

EXAMPLE 3

| CONSTITUENT | PERCENT OF TOTAL SOLIDS |
|---|---|
| Aramid Fiber (KEVLAR 979) | 12 |
| Diotomaceous Earth (CELITE 321) | 71.7 |
| Curatives, Antioxidents Processing Aids, Blue Dye | 2.4 |
| Phenolic Resin | 3.1 |
| Polyacrylic Latex | 10.8 |

The blue dye of Examples 2 and 3 gave the final composition a blue color to more closely resemble the coloration of a gasket material containing the African blue asbestos and was also employed in Example 1. A gasket material was formed from the composition of Example 2 and subjected to various tests. Compressibility was tested by the ASTM F36 testing method for type 1 materials. Recovery of the resulting gasket material was determined by the same testing method. The material was further tested for creep relaxation by the ASTM F38 testing method at 2500 p.s.i. and 350° F.

Furthermore, tensile strength of the resulting gasket material was tested by the ASTM F152 testing method.

Table 1 lists the results of these various tests performed upon a gasket comprised of the material composition of Example 2.

TABLE 1

| PROPERTIES | |
|---|---|
| Thickness (inches) | 0.080 |
| Density (grams per centimeter) | 0.63 |
| Compressibility at 5000 psi (%) | 34.6 |
| Recovery (%) | 23.8 |
| CD Tensile Strength (psi) | 899 |
| Creep relaxation at 350° F., 2500 psi, over 20 hours (%) | 60.8 |

Table 2 compares a gasket material formed from the composition of Example 3 with a typical prior art asbestos containing gasket material comprised of 78% African blue asbestos, 17% butyl latex and 5% of conventional curatives, antioxidents and processing aids. The tests were the same as described above.

TABLE 2

| PROPERTIES | ASBESTOS CONTAINING GASKET MATERIALS | GASKET MATERIAL OF THE PRESENT INVENTION |
|---|---|---|
| Thickness in inches | 0.132 | 0.124 |
| Density in grams per centimeter | 0.98 | 0.57 |
| Tensile Strength in psi | 508 | 586 |
| Compressibility by percent at 5000 psi | 42.8 | 45.8 |
| Recovery in percent | 27.4 | 21.8 |
| Creep relaxation in percent at 350° F., 2500 psi for 20 hours | 68.1 | 72.9 |

From Table 2 it is seen that a gasket material prepared in accordance with the present invention has similar properties to a gasket material containing African blue asbestos. Further tests were performed with the gasket material of Example 3 and the above described asbestos containing gasket material to determine certain properties after immersion in a concentrated hydrochloric acid solution (12 N). Tests for compressibility, recovery and tensile strength were conducted as described above. A test to determine the percent of thickness change was performed by the ASTM F146 testing method. Also, the percent of weight change was measured by the same testing method. Table 3 shows the results of these further tests upon the asbestos containing gasket material and the gasket material of Example 3.

TABLE 3

| PROPERTIES | ASBESTOS CONTAINING GASKET MATERIALS | GASKET MATERIAL OF THE PRESENT INVENTION |
|---|---|---|
| Percent of compressibility at 5000 psi | 50.8 | 50.6 |
| Percent of recovery | 20.7 | 17.8 |
| Tensile Strength, psi | 151 | 263 |
| Percent of thickness change | 40.4 | 0 |
| Percent of weight change | 123 | 92.8 |

From Table 3 it is seen that the gasket material of the present invention performs similarly or better than the gasket material containing African blue asbestos.

The following Tables 4 and 5 compare an asbestos containing gasket material, as described above, with a gasket material comprised of 12% Aramid fiber, 72% diatomaceous earth, 2.5% curatives, antioxidants, processing aids and blue dye, 3% phenolic resin and 10.5% of a polyacrylic Latex. The properties were determined according to the above mentioned tests. In Table 4 the gasket materials were immersed in the various chemical solutions for 24 hours at room temperature before testing. Table 5 provides a comparison between asbestos containing materials and gasket materials of the present invention when subjected to a temperature of 500° F.

TABLE 4

| | Present Invention | Asbestos |
|---|---|---|
| 30% HCL Solution | | |
| Thickness change % | 0 | 41.0 |
| Weight change % | 94.5 | 137.6 |
| Compressibility @ 5000 psi % | 48.0 | 52.2 |
| Tensile strength psi | 300 | 135 |
| 30% H2SO4 Solution | | |
| Thickness change % | 0 | 39.0 |
| Weight change % | 58.1 | 175.2 |
| Compressibility @ 5000 psi % | 47.5 | 51.8 |
| Tensile strength psi | 300 | 98 |
| 30% HNO3 Solution | | |
| Thickness change % | 0 | 38 |
| Weight change % | 100.5 | 261.3 |
| Compressibility @ 5000 psi % | 49.7 | 51.8 |
| Tensile strength psi | 219 | 79 |
| 5% NaOH Solution | | |
| Thickness change % | 0 | 40 |
| Weight change % | 109.8 | 197.7 |
| Compressibility @ 5000 psi % | 52.3 | 49.4 |
| Tensile strength psi | 131 | 70 |

TABLE 5

| | Present Invention | Asbestos Containing |
|---|---|---|
| Compressibility Change at 1,000 psi, % Material Starting Thickness | | |
| .062" | +5.3 | −3.4 |
| .125" | +1.3 | +1.6 |
| Compressibility Change at 5,000 psi, % Material Starting Thickness | | |
| .062" | +3.6 | −4.3 |
| .125" | +1.3 | +1.6 |
| Weight Loss, % Material Starting Thickness | | |
| .062" | 13.1 | 18.2 |
| .125" | 12.8 | 17.0 |
| Tensile Loss, % Material Starting Thickness | | |
| .062" | 25.7 | 79 |

Table 6 below compares three different thicknesses of a gasket material of the present invention comprising 12% Aramid fiber, 72% Diatomaceous earth, 2.5% Curatives, Antioxidants, processing aids and blue dye, 3% phenolic resin and 10.5% of a poly acrylic latex before and after exposure to an acid and alkali.

TABLE 6

| Property | | | |
|---|---|---|---|
| Thickness in. | .031 | .062 | .125 |
| Density g/cc | .52 | .56 | .63 |

TABLE 6-continued

| Property | | | |
|---|---|---|---|
| Tensile strength psi | 597.7 | 608.9 | 721.2 |
| Compressibility @ | | | |
| 5000 psi % | 49.6 | 46.6 | 39.0 |
| Recovery | 15.8 | 17.3 | 26.2 |
| Compressibility @ | | | |
| 1000 psi % | 30.8 | 27.4 | 15.7 |
| Recovery | 30.7 | 30.6 | 48.9 |
| $H_2SO_4$ (10%) 22 hour immersion at room temperature | | | |
| Tensile strength psi | 324.3 | 337.6 | 509.1 |
| % Loss in tensile strength | −45.7 | −44.6 | −29.4 |
| Compressibility @ | | | |
| 5000 psi % | 50.9 | 50.2 | 42.7 |
| % change in compressibility | +2.6 | +7.7 | +9.5 |
| Recovery % | 15.8 | 16.4 | 23.2 |
| % change in recovery | 0 | −5.2 | −11.4 |
| NaOH (5%) 22 hour immersion at room temperature | | | |
| Tensile strength psi | *88.7 | *95.6 | 157.3 |
| % Loss in tensile strength | *−85.2 | *84.3 | −78.2 |
| Compressibility @ | | | |
| 5000 psi % | 53.7 | 53.0 | 50.7 |
| % change in compressibility | +8.3 | +13.7 | +30.0 |
| Recovery % | 20.4 | 18.6 | 24.4 |
| % change in recovery | +29.1 | +7.5 | −6.9 |

*Estimated to closest values obtained

While the preferred embodiments have been disclosed and described, various modifications and substitutions may be made thereto without departing from the spirit and scope of the invention. Accordingly, it is to be understood that the present invention has been described by way of illustration and not limitation.

What is claimed is:

1. A compressible soft asbestos free gasket material comprising:
   5–40% of the total solids being fibrillated aramid fibers;
   25–85% of the total solids being diatomaceous earth;
   0.5–10% of the total solids being phenolic resin;
   5–25% of the total solids being a polyacrylic latex selected from the group consisting of ethylacrylates, butylacrylates and combinations thereof; and
   1–10% of the total solids being selected from the group including crosslinker, antioxident, and pigments.

2. The gasket material of claim 1 wherein said diatomaceous earth is of a particle size ranging between 1–100 microns.

3. The gasket material of claim 1 wherein said crosslinker is acrylonitrile.

4. The gasket material of claim 1 wherein said polyacrylic latex comprises:
   1% to 70% of a polyacrylic solid and a small amount of acrylonitrile.

5. The gasket material of claim 4 wherein said polyacrylic solid is comprised of 90% polyacrylic and 10% acrylonitrile.

6. The gasket material of claim 1 wherein said aramid fibers are of a length ranging between one-half and 4 millimeters and a diameter between 0.001 to 0.0035 millimeters.

* * * * *